United States Patent [19]
Ford

[11] Patent Number: 5,676,040
[45] Date of Patent: Oct. 14, 1997

[54] AUTOMATIC REFILL BREWING APPARATUS

[75] Inventor: David F. Ford, Springfield, Ill.

[73] Assignee: Bunn-O-Matic Corporation, Springfield, Ill.

[21] Appl. No.: 633,956

[22] Filed: Apr. 15, 1996

[51] Int. Cl.⁶ ..................................................... A47J 37/00
[52] U.S. Cl. ........................................ 99/280; 99/285
[58] Field of Search ............................ 99/279, 280, 283, 99/281, 282, 289 R, 295, 299, 300, 302 R, 304, 307, 316, 323, 323.3, 285; 426/433

[56] References Cited

U.S. PATENT DOCUMENTS

| | | | |
|---|---|---|---|
| 2,830,528 | 4/1958 | Arnett | 99/283 |
| 2,890,643 | 6/1959 | King | 99/283 |
| 5,134,925 | 8/1992 | Bunn et al. | |
| 5,158,793 | 10/1992 | Helbling | |
| 5,186,399 | 2/1993 | Knepler et al. | |
| 5,230,278 | 7/1993 | Bunn et al. | |
| 5,255,593 | 10/1993 | Bunn et al. | |
| 5,303,639 | 4/1994 | Bunn et al. | |
| 5,309,819 | 5/1994 | Ford | |
| 5,372,832 | 12/1994 | Bunn et al. | |
| 5,393,540 | 2/1995 | Bunn et al. | |

*Primary Examiner*—Reginald Alexander
*Attorney, Agent, or Firm*—Trexler, Bushnell, Giangiorgi & Blackstone, Ltd.

[57] ABSTRACT

A sensing assembly which includes a sensing device. The sensor assembly is constructed for use with an automatic beverage apparatus. The sensing assembly is attached to a beverage reservoir and senses, by physical contact, a quantity of beverage retained in the reservoir. The sensing assembly provides information about the quantity of beverage retained in the reservoir. When coupled to a beverage brewing apparatus, the beverage brewing apparatus will automatically produce a predetermined quantity of beverage in response to conditions sensed by said sensing assembly.

14 Claims, 2 Drawing Sheets

1

AUTOMATIC REFILL BREWING APPARATUS

BACKGROUND

The present invention relates to a beverage dispensing device which automates many of the steps involved in producing a beverage. Further, this invention relates to a device which automatically brews a quantity of beverage in response to a selected condition or set of conditions.

Reference is made herein to a type of beverage dispensing device which includes beverage brewing apparatus. A variety of automatic beverage brewing apparatus are known in the art. For example, the following list of patents provides some background information as to the number and variety of beverage brewing apparatus which are, at least to some degree, automated.

| Patent No. | Issue Date | Inventor |
| --- | --- | --- |
| 5,134,925 | 08/04/92 | Bunn et al. |
| 5,158,793 | 10/27/92 | Helbling |
| 5,186,399 | 02/16/93 | Knepler et al. |
| 5,230,278 | 07/27/93 | Bunn et al. |
| 5,255,593 | 10/26/93 | Bunn et al. |
| 5,303,639 | 04/19/94 | Bunn et al. |
| 5,309,819 | 05/10/94 | Ford |
| 5,372,832 | 12/13/94 | Bunn et al. |
| 5,393,540 | 02/28/95 | Bunn et al. |

Each of the apparatus as taught by the foregoing patents provide improvements over the art. Generally, each of these apparatus include a beverage brewing substance delivery assembly to deliver beverage brewing substance to a brewer assembly. When substance is delivered to the brewer assembly, heated water is introduced into the brewer assembly to infuse the beverage brewing substance and produce a brewed beverage therefrom. A variety of controls and structures are provided to automate the brewing process to eliminate most of the steps of the brewing process from manual control. For example, the beverage brewing substance delivery assembly delivers a selected quantity of brewed beverage to a brew chamber. A water distribution system automatically delivers a selected quantity of water from a heated water reservoir to the brew chamber to infuse the brewing substance. Once the brewed beverage has been dispensed from the brew chamber, the brew chamber is automatically flushed to remove spent beverage brewing substance therefrom.

Essentially, most of the devices set forth in the foregoing patents merely require a user to periodically add beverage brewing substance to the apparatus and to select a type or quantity of beverage to be brewed. Periodically, spent beverage brewing substance may need to be removed, however, improvements have also been made to automate the removal of such beverage brewing substance from the apparatus. As shown in U.S. Pat. No. 5,303,639, water is automatically delivered to and dispensed from the heated water reservoir.

As noted above, the user of a device as shown in the aforementioned patents must still determine when beverage must be brewed. While of some of these devices are directed to single serving dispensing, the volume producing devices still require user interaction to select when and how much beverage to brew.

As such, it would be desirable to provide a beverage brewing apparatus which also automatically senses when to produce a brewed beverage and produces a predetermined quantity of brewed beverage as necessary.

OBJECTS AND SUMMARY

A general object satisfied by the claimed invention is to provide a beverage brewing apparatus which automatically senses when to produce a quantity of beverage and produces a quantity of beverage in response thereto.

Another object satisfied by the claimed invention is to provide a sensing assembly which senses predetermined conditions relating to a quantity of brewed beverage available for dispensing.

Yet a further object of the present invention is to provide a sensor device which can be attached to a brewed beverage reservoir for physically contacting and sensing a quantity of beverage retained therein.

Briefly, and in accordance with the foregoing, the present invention envisions a sensing assembly which includes a sensor device. The sensing assembly is constructed for use with an automatic beverage apparatus. The sensing assembly is attached to a beverage reservoir and senses, by physical contact, a quantity of beverage retained in the reservoir. The sensing assembly provides information about the quantity of beverage retained in the reservoir. When coupled to a beverage brewing apparatus, the beverage brewing apparatus will automatically produce a predetermined quantity of beverage in response to conditions sensed by said sensing assembly.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which.

DESCRIPTION

Figure 1:
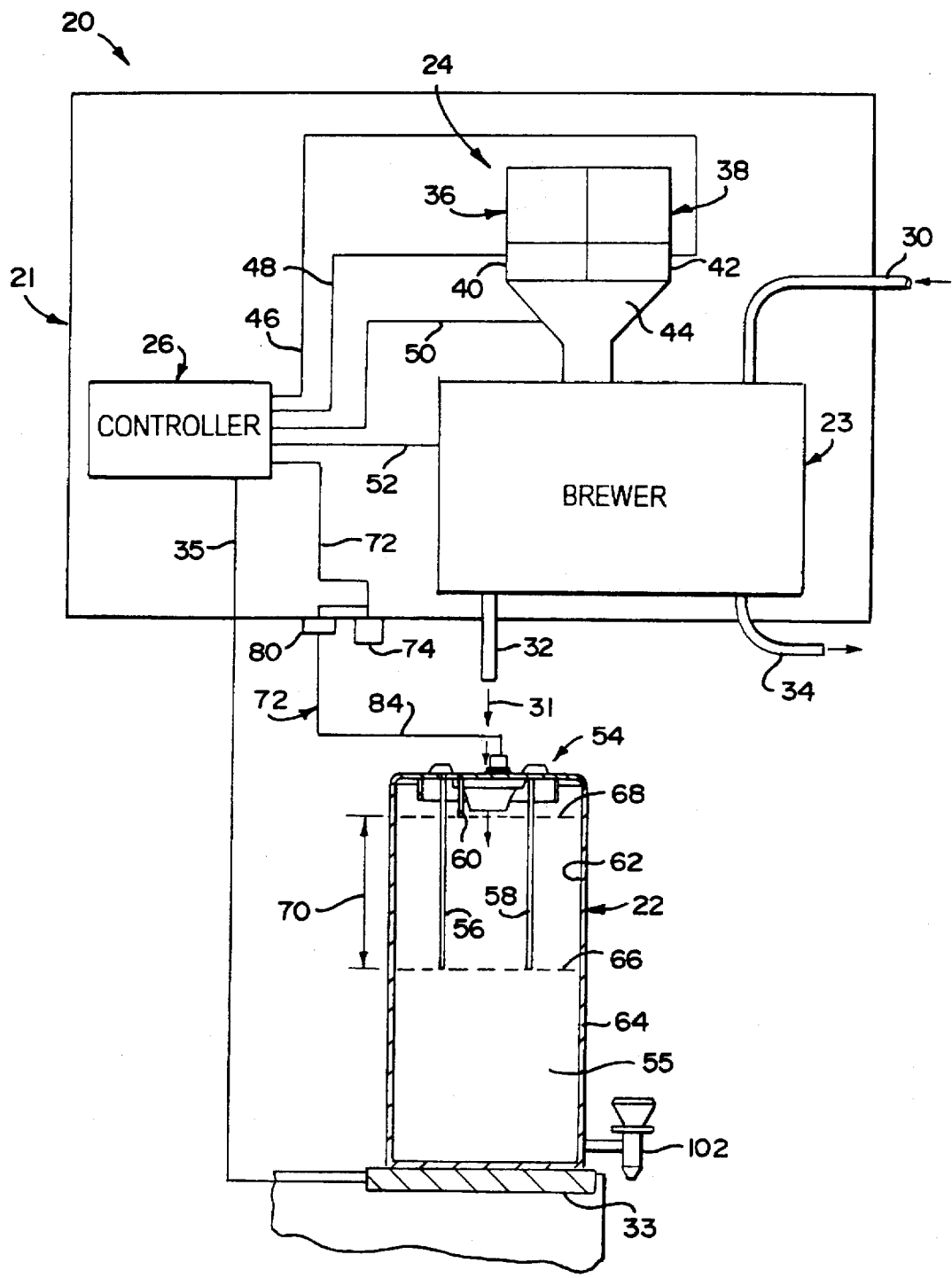
FIG. 1 is a partial fragmentary, partial cross-sectional, view of a beverage reservoir combined with a diagrammatic illustration of a sensing assembly.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Referring now to the drawings, wherein like parts are designated by the same reference numerals throughout the figures, an automatic beverage dispensing apparatus 20 is diagrammatically illustrated in FIG. 1. The beverage dispensing apparatus 20 includes a beverage ingredient mixing assembly 21 and a beverage reservoir 22. As provided herein the beverage dispensing apparatus 20 is shown and described herein by way of example as a beverage brewing apparatus 20 in which the beverage ingredient mixing assembly 21 includes a brewer assembly 23 and a substance dispensing assembly 24. The beverage ingredient mixing assembly 21 includes a controller 26 coupled to both the substance dispensing assembly 24 and the brewer assembly 23. An inlet line 30 is connected to and delivers water to the beverage ingredient mixing assembly 21. In the beverage brewer configuration, the mixing assembly 21 of the brewing apparatus 20 includes a heating device (not shown) which heats water from the inlet line 30 to infuse a beverage brewing substance. The heating device may be any one of a number of devices of known construction as used by prior art brewing apparatus.

A brewed beverage is produced by the brewer assembly 23 during a brew cycle during which a selected quantity of brewing substance is dispensed from the substance dispensing assembly 24 into the brewer assembly 23. The beverage substance is mixed with water from inlet line 30. Brewed beverage 31 is dispensed through a discharge line 32 into the reservoir 22. A warmer 33, coupled to the controller 26 over line 35, is provided to maintain the beverage at a desired temperature until dispensed for serving. The brew cycle is completed by cleaning the brewer assembly 23 to remove spent beverage brewing substance which was used to produce the brewed beverage. Spent beverage brewing substance and any other by products of the brewing process are removed from the brewer assembly through a drain line 34.

Reference to the brewing apparatus 20 is further supported by the following patents which are hereby incorporated by reference in the present application:

| Patent No. | Issue Date | Inventor |
| --- | --- | --- |
| 5,134,925 | 08/04/92 | Bunn et al. |
| 5,186,399 | 02/16/93 | Knepler et al. |
| 5,230,278 | 07/27/93 | Bunn et al. |
| 5,255,593 | 10/26/93 | Bunn et al. |
| 5,303,639 | 04/19/94 | Bunn et al. |
| 5,309,819 | 05/10/94 | Ford |
| 5,372,832 | 12/13/94 | Bunn et al. |
| 5,393,540 | 02/28/95 | Bunn et al. |

The substance dispensing assembly 24 as diagrammatically shown in FIG. 1 represents an assembly 24 which includes a pair of hoppers 36, 38, hopper control devices 40, 42, and a grinder mechanism 44. The controller 26 is coupled to the grinder control devices 40, 42 over control lines 46, 48, respectively, and the grinder mechanism 44 over line 50. Coupling of the controller 26 to the brewer assembly 23 is generally represented by control line 52 although this control line 52 may actually include numerous control connections to the brewer assembly 23 as the result of operating various drive mechanisms, valves or other components thereof.

Having briefly reviewed the primary elements of the brewing apparatus 20, it should be noted that various modifications to these systems may be made within the scope of the claims of present invention. For example, the substance dispensing assembly 24 may be configured to handle preground brewing substance or other substances such as tea, soup, or cocoa. In such an embodiment, the grinding mechanism 44 would not be required. Therefore, the substance dispensing assembly 24 should be considered to be broadly construed for purposes of the invention of the present case. Likewise, the brewer assembly 23 may be broadly construed as well. While a preferred embodiment of the brewer assembly 23 is shown and described in the aforementioned patents, and which also are incorporated herein by reference, it should be appreciated that other forms of the brewing assembly 23 may be used with the present invention.

With the foregoing in mind, the present invention further includes a sensing assembly 54 for detecting a quantity condition of beverage 55 retained in the beverage reservoir 22. As shown in FIG. 1, the sensing assembly 54 includes a first probe 56, a second probe 58 and a third probe 60 which extend into a cavity 62 defined by wall 64 of the reservoir 22. The first and second probes 56, 58 are positioned in the reservoir 22 and used to detect a first quantity condition of the beverage 55 retained in the reservoir 22. The third probe 60 is positioned at the reservoir 22 and used to detect a second quantity condition. More specifically, the first and second probes 56, 58 are used to detect a minimum desired quantity level 66 of beverage 55 in the reservoir 22. The third probe 60 is used to detect a full or maximum quantity level 68 in the reservoir 22. The difference 70 between the minimum level 66 and the full level 68 is a selected quantity of beverage which can be produced by the brewer assembly 23 during one or more brew cycles.

The first and second probes 56, 58 are conductive and are used to indicate that the minimum level 66 is available for dispensing from the reservoir 22. When the minimum level is achieved the beverage in the reservoir will contact both probe 56, 58 to produce a closed circuit. When the beverage in the reservoir 22 is at the minimum level 66, it can be seen that the probe 60 is not in contact with the beverage. As a result of the sensing assembly 54 being coupled to the controller 26 over line 72, the controller 26 can activate the brewer assembly 23 and substance dispensing assembly 24 to produce beverage. The quantity of beverage to be produced during one or more brew cycles is pre-selected to be generally equal to or less than the quantity 70 which will fill the difference 70 between the probes 56, 58, 60.

The line 72 coupling the sensing assembly 54 to the controller 26 includes a switch 74. The switch 74 allows the automatic refilling function of the sensing assembly 54 in combination with the controller 26 to be selectable by a user. For example, if a user does not wish to benefit from the automatic refill feature, the switch may be turned to an "off" position thereby switching off the automatic refill function. However, when a user wishes to benefit from the automatic refill and refreshing function, the switch 74 is moved to an "on" position.

Figure 2:
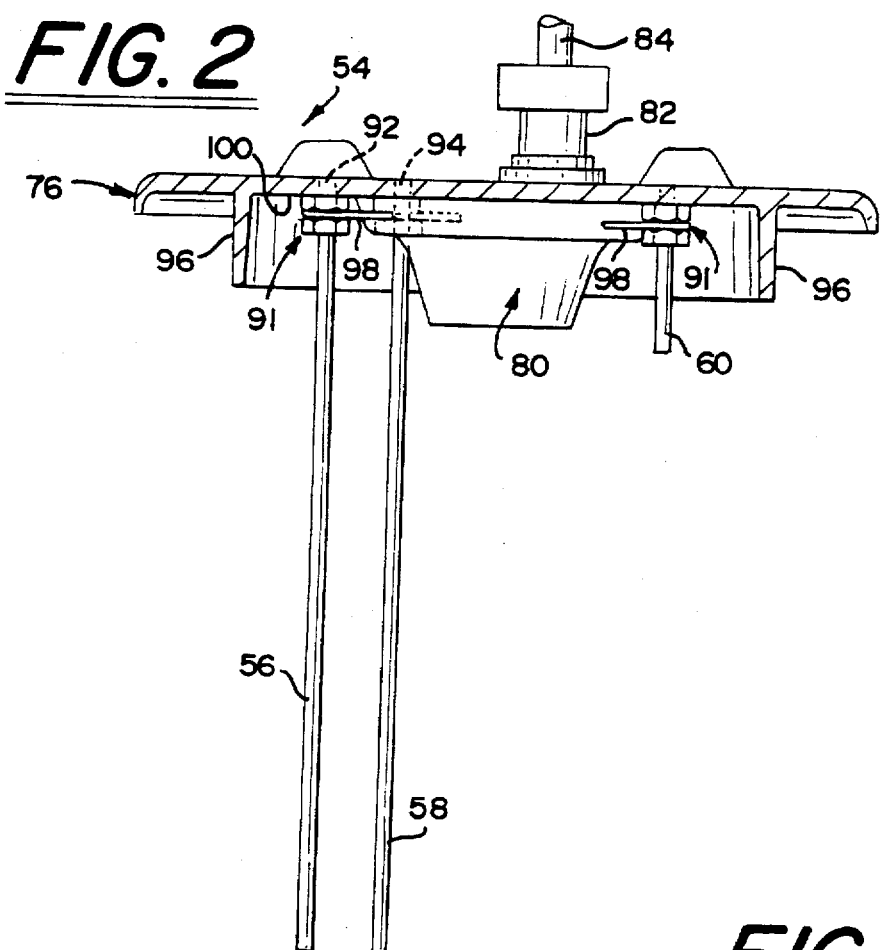
FIG. 2 is an enlarged side elevational view of a sensing device of the sensing assembly for use with a beverage reservoir.
Figure 3:
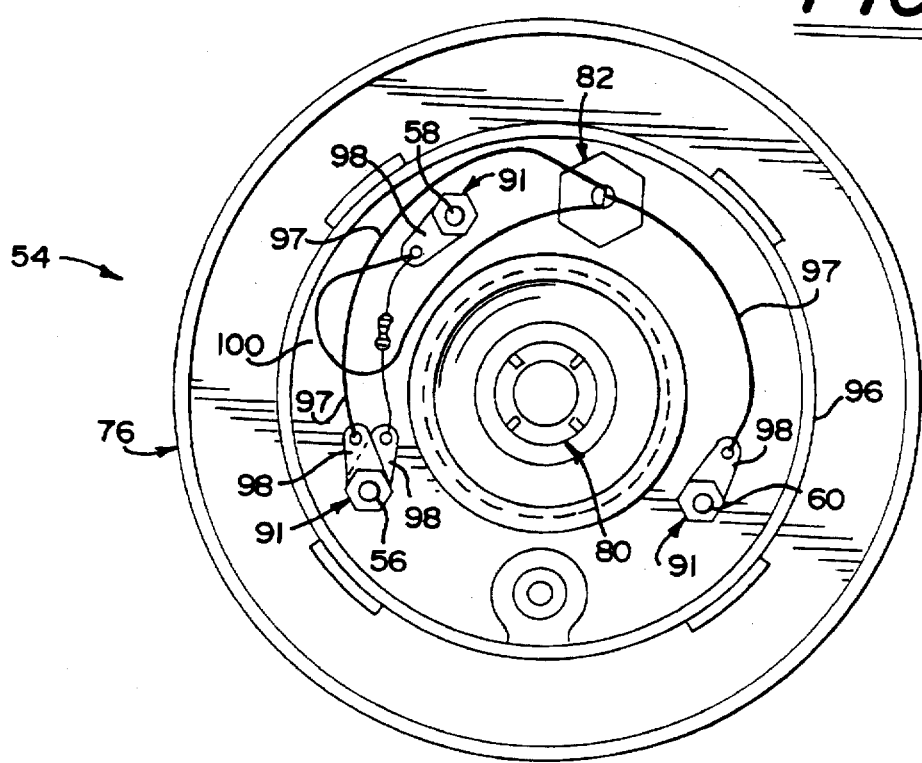
FIG. 3 is a bottom plan view taken along line 3—3 in FIG. 2 showing the arrangement of sensor probes attached to a lid portion of the sensing device.

With further reference to FIGS. 1–3, the sensing assembly 54 of the present invention includes a lid assembly 76 which overlies and closes a mouth 78 of the reservoir 22. The lid assembly 76 and a brew through opening 80 therein are disclosed in U.S. Pat. No. 5,480,054 to Midden and U.S. Pat. No. 4,739,898 to Brown, both of which are assigned to the assignee of the present invention and which are also incorporated herein by reference. The brew through opening 80 allows a reservoir 22 having the sensing assembly 54 attached thereto to be positioned under a discharge line 32. Beverage 31 is dispensed through the discharge line 32 directly into the brew through opening 80 and into the cavity 62 of the reservoir 22.

The probes 56, 58, 60 are attached to the lid assembly 76. As shown in FIGS. 1–3, the probes are positioned at spaced apart locations on the lid assembly 76. Further, the spaced-apart locations of the probes 56, 58, 60 prevents bridging the beverage between the exterior surfaces of the probes.

Additionally, a connector jack 82 is attached to the lid assembly 76 and coupled to the probes 56, 58, 60. The connector jack 82 provides a convenient coupling connection for a cable 84 which comprises a portion of the line 72 connecting the sensing assembly 54 to the controller 26. The cable 84 is attachable to and detachable from the sensing assembly 54 and a corresponding connector jack 86 attached to a housing 88 of the brewing apparatus 20.

The probes 56, 58, 60 are attached to the lid assembly 76 by means of connecting structures 91 comprising a threaded portion 92 on each probe 56, 58, 60 which is threadedly engaged with a corresponding threaded bore 94 formed in the lid assembly 76. A rim 96 is provided on the lid assembly 76 to mate with the mouth 78 of the reservoir 22. The probes 56, 58, 60 are attached to the lid assembly 76 inwardly of the rim 96 to provide easy engagement and removal of the probes through the mouth 78.

As shown in FIG. 3, the connecting structures 91 also include conductive connectors 98 by which the probes 56, 58, 60 are coupled to the connector jack 82. Wires 97 are attached to conductive connectors 98 and the jack 82. The connectors 98 are spaced away from an inside surface 100 of the lid assembly 76 to prevent the bridging or accumulation of condensate which may form on the inside surface 100 of the lid assembly 76. Preventing bridging of the connectors 98 minimizes false readings or shorts between the probes 56, 58, 60. Further, the connecting structures 91, including the connectors 98, portions of the probes 56, 58, 60, and the wires 97, may be encapsulated in a nonconductive material such as a potting compound of known formulation. The encapsulation of these elements further protects this element.

It should be noted that the dimensions of the probes 56, 58, 60 may vary depending on the desired quantities of beverage at which the sensor assembly detects desired levels 66, 68 of beverage. Further, various forms of the probe 56, 58, 60 may be used other than the generally rigid rod-type probes which are shown in the preferred embodiment. Also multiple sensing assemblies 54 may be connected to a single controller 26. Such multiple sensing assemblies 54 may require movement of corresponding reservoirs relative to the discharge line 32 or multiple discharge lines and corresponding control valves. Additionally, while an automated substance dispensing assembly 24 as shown in the preferred embodiment of the present invention, it should be understood that the present invention may produce a signal indicating to the operator to place the required brewing substance in the brewer or in a grinding mechanism 44 attached to the brewer. These and other variations on the present invention should be considered to be included within the scope of the present application.

Having set forth the general and detailed description of the present invention, we now turn to the use and operation of the present invention. Once the sensing assembly 54 is coupled by way of line 72 to the controller 26, the system will not work unless the switch 74 is in the "on" position. Alternatively, the switch 74 may be excluded from the system whereupon the system will generally continuously operate in response to the level of beverage in the reservoir. However, in the preferred embodiment, the switch 74 provides additional operator control. Once the switch 74 is in the "on" position, the probes 56, 58, 60 will be able to provide signals to the controller 76 indicative of the quantity condition of the beverage 55 in the reservoir 22. When the beverage 55 in the reservoir 22 is not of sufficient volume or height to contact both the first and second probes 56, 58, the probes will not be conductively connected through the beverage 55. As a result, the controller 26 will detect that the brew level 66 is below a desired minimum level. The controller 26 will then operate the brewer assembly 23 and dispensing assembly 24 for at least one brew cycle to produce a brewed beverage.

Once the one or more brew cycles have been completed, and assuming that the probes 56, 58 now contact the beverage 55 or are immersed in the beverage 55, the brewer assembly 23 will not produce additional beverage. If the production of the additional beverage contacts the third probe 60, the controller will receive a signal and will respond by stopping further automatic dispensing. As beverage is drawn out of the reservoir 22 through a dispensing valve 102, the level or volume of beverage in the reservoir 22 will drop. Once the quantity drops below a desired minimum level 66, the first and second probes 56, 58 will become an open circuit thereby providing a signal to the controller 26 that additional beverage is needed to replenish and refresh the reservoir 22.

The present invention provides the numerous benefits over the prior art in that it may be used to continuously refill, mix and refresh beverage retained in a reservoir. Such an invention is important to round-the-clock operation and can provide many automated benefits further reducing the labor needs of a round-the-clock operation. This is important since many 24 hour service operations need to minimize labor costs and improve automated operation in order to maintain profitability.

The present invention essentially results in a completely automated operation. Taking into consideration that the inlet line 30 is connected to a continuous water supply and the drain line is connected to a waste disposal system or appropriate drain line, water does not need to be manually added to the system and grounds may need to be removed only after numerous brewing cycles. Further, in the preferred embodiment, automated substance dispensing assembly 24 is provided thereby only requiring filling of the hoppers 36, 38 to provide brewing substance to the brewer assembly 23. Finally, the sensing assembly 54 of the present invention provides signals to the controller 26 which automate the refill and refresh of beverage retained in the reservoir 22. As such, an operator effectively may continuously dispense beverage from the reservoir 22 and only infrequently refill the brewing substance, and perhaps removes spent beverage brewing substance. The present invention, by further automating a beverage brewing process eliminates the numerous set-up, measuring, selecting and operating steps found in prior art systems.

While a preferred embodiment of the present invention is shown and described, it is envisioned that those skilled in the art may devise various modifications and equivalents without departing from the spirit and scope of the appended claims. The invention is not intended to be limited by the foregoing disclosure.

The invention claimed is:

1. A sensing assembly for use with a beverage producing apparatus having an ingredient mixing assembly and a controller for controlling said ingredient mixing assembly to produce a beverage therefrom, said ingredient mixing assembly dispensing beverage to a reservoir for retaining said beverage therein to allow selective dispensing of said beverage therefrom, said sensing assembly comprising:

a first probe associated with said reservoir for sensing a first quantity condition of said beverage in said reservoir;

a second probe associated with said reservoir for sensing a second quantity condition of said beverage in said reservoir; and a third probe associated with said reservoir for sensing a third reservoir quantity condition of said beverage in said reservoir.

2. A sensing assembly as recited in claim 1, said sensing assembly further comprising:

a lid assembly for covering a mouth of said reservoir;

said first, second, and said third probes being attached to and projecting from said lid assembly for being positioned through said mouth and extending into a cavity defined by said reservoir; and said first and second probe have a length dimension which is greater than said third probe.

3. A sensing assembly as recited in claim 1, wherein said first, second, and third probes are coupled to said controller for providing a signal to said controller indicating at least two quantity conditions in said reservoir.

4. A sensing assembly as recited in claim 3, further comprising a coupling cable, said coupling cable being connected to said sensing assembly and to said controller, said coupling cable being removable from said sensing assembly for selective attachment to said sensing assembly.

5. A sensing assembly as recited in claim 1, said sensing assembly further comprising a switch coupled to said sensing assembly for selectively activating and deactivating said sensing assembly independent of the activation and deactivation of said controller.

6. A sensing assembly as recited in claim 2, further comprising connecting structures for attaching said first, second and third probes to said lid.

7. A sensing assembly as recited in claim 6, wherein said connecting structures include a threaded portion on each of said first, second and third probes, said threaded portion threadedly engaging respective corresponding threaded bores in said lid.

8. A sensing assembly as recited in claim 6 further comprising:

a connector jack attached to said lid assembly to provide a coupling structure for connecting to said controller; and electrical contacts attached to said connecting structures for electrically connecting said probes to said connector jack.

9. A sensing assembly as recited in claim 6 further comprising:

a dispensing opening on said lid assembly for allowing beverage brewed by said brewer assembly to be discharged to said reservoir through said lid assembly for accumulation in said cavity of said reservoir while retaining said lid assembly over said mouth of said reservoir.

10. A beverage brewing apparatus for preparing a brewed beverage by infusing a beverage brewing substance with heated water, said beverage brewing apparatus including a brewer assembly having an inlet line for delivering water to said brewing apparatus for infusing a brewing substance, a discharge line for dispensing brewed beverage from said brewing apparatus, and a drain line for exhausting spent beverage brewing substance from said brewer assembly; a brewing substance dispensing assembly for delivering brewing substance to said brewer assembly; and a controller for operating said brewing substance dispensing assembly and brewer assembly for producing at least a desired quantity of beverage therefrom; a reservoir defining a cavity for receiving brewed beverage therein; said beverage brewing apparatus further comprising:

a sensing assembly associated with said reservoir for sensing at least a first and second quantity condition of said beverage retained in said reservoir, said sensing assembly being coupled to said controller for indicating a first quantity condition, said controller operating said beverage brewing apparatus to produce one or more batches of a selected quantity of beverage until said first quantity condition is achieved, and said sensing assembly also detecting a second quantity condition indicative of a full reservoir condition.

11. A beverage brewing apparatus as recited in claim 10, said sensing assembly further comprising:

a lid assembly for covering a mouth of said reservoir; said first, second, and said third probes being attached to and projecting from said lid assembly for being positioned through said mouth and extending into a cavity defined by said reservoir;

said first and second probes have a length dimension which is greater than said third probe.

12. A beverage brewing apparatus as recited in claim 11, further comprising connecting structures for attaching said first, second and third probes to said lid.

13. A beverage brewing apparatus as recited in claim 11, wherein said connecting structures include a threaded portion on each of said first, second and third probes, said threaded portion threadedly engaging respective corresponding threaded bores in said lid.

14. A beverage brewing apparatus as recited in claim 10, wherein said sensing assembly sensing at least one of said first and second quantity conditions of said reservoir and produces one or more batches of a selected quantity of beverage in response thereto, said selected quantity of beverage brewed by said beverage brewing apparatus approximating the difference of the quantity in the reservoir represented by the first and second quantity conditions.

* * * * *